United States Patent
Kim et al.

(10) Patent No.: US 8,341,721 B2
(45) Date of Patent: Dec. 25, 2012

(54) WEB-BASED TRACEBACK SYSTEM AND METHOD USING REVERSE CACHING PROXY

(75) Inventors: Jong Hyun Kim, Daejeon (KR); Geon Lyang Kim, Daejeon (KR); Jong Ho Ryu, Cheonan-si (KR); Chi Yoon Jeong, Daejeon (KR); Seon Gyoung Sohn, Daejeon (KR); Beom Hwan Chang, Daejeon (KR); Jung-Chan Na, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 297 days.

(21) Appl. No.: 12/467,462

(22) Filed: May 18, 2009

(65) Prior Publication Data

US 2010/0030891 A1    Feb. 4, 2010

(30) Foreign Application Priority Data

Jul. 30, 2008 (KR) .................. 10-2008-0074727

(51) Int. Cl.
*G06F 15/16* (2006.01)
*G06F 15/173* (2006.01)

(52) U.S. Cl. .............................. 726/12; 726/11; 709/224

(58) Field of Classification Search .................... 726/12, 726/13, 14, 11; 709/224
See application file for complete search history.

(56) References Cited

U.S. PATENT DOCUMENTS

| | | | | |
|---|---|---|---|---|
| 7,032,017 B2 * | 4/2006 | Chow et al. | ..... | 709/223 |
| 7,600,230 B2 * | 10/2009 | Desai et al. | ..... | 719/311 |
| 7,849,502 B1 * | 12/2010 | Bloch et al. | ..... | 726/11 |
| 2003/0172155 A1 * | 9/2003 | Kim | ..... | 709/224 |
| 2005/0114497 A1 * | 5/2005 | Mani et al. | ..... | 709/224 |
| 2006/0218623 A1 * | 9/2006 | Hodges et al. | ..... | 726/3 |

FOREIGN PATENT DOCUMENTS

| | | |
|---|---|---|
| JP | 2004-30286 | 1/2004 |
| JP | 2004-520654 | 7/2004 |
| JP | 2006-185169 | 7/2006 |
| KR | 10-0426317 | 3/2004 |
| KR | 10-0564750 | 3/2006 |
| KR | 100577829 | 5/2006 |

OTHER PUBLICATIONS

Kim, Tae Bong et al., "Analysis of Trend of Trace-back Technology and Applicable Examples," Journal of Information Protection (2005).
Korean Notice of Allowance for Application No. 10-2008-0074727, dated Mar. 29, 2010.

* cited by examiner

*Primary Examiner* — Philip Lee
(74) *Attorney, Agent, or Firm* — Nelson Mullins Riley & Scarborough LLP; EuiHoon Lee, Esq.

(57) ABSTRACT

Provided are a web-based traceback system and method using reverse caching proxy, which can effectively protect a web server against various attacks launched by illegitimate user by acquiring network information and location information of users who attempt to access the web server through an anonymous server, without a requirement of installing any agent program in the users' clients. The web-based traceback system may include a reverse caching proxy server receiving a hypertext transfer protocol (HTTP) packet transmitted to a web server by a client, analyzing the header of the HTTP packet and determining whether the client has attempted to access the web server through an anonymous server based on the results of the analysis; and a web tracking server generating a response page for the HTTP packet upon receiving the results of the determination performed by the reverse caching proxy server, inserting a tracking code in the response page, and providing the response page to the client through the reverse caching proxy server, wherein the tracking code is automatically executed in a web browser of the client and thus provides network information of the client to the web tracking server.

12 Claims, 4 Drawing Sheets

WEB-BASED TRACEBACK SYSTEM AND METHOD USING REVERSE CACHING PROXY

CROSS-REFERENCE TO RELATED APPLICATION

This application claims priority from Korean Patent Application No. 10-2008-0074727 filed on Jul. 30, 2008 in the Korean Intellectual Property Office, the disclosure of which is incorporated herein by reference in its entirety.

BACKGROUND OF THE INVENTION

1. Field of the Invention

The present invention relates to a web-based traceback system and method using reverse caching proxy, and more particularly, to a web-based traceback system and method using reverse caching proxy, which can effectively track down an illegitimate user who attempts to access a web server using anonymous proxy to hide his/her network information.

The present invention is based on research (Project No.: 2007-S-022-022, Project Title: Development of Intelligent Cyber Attack Monitoring and Tracking System for use in All-IP environment) conducted as part of Information Technology (IT) Growth Power Technology Development Project launched by Ministry of Information and Communication and Institute for Information Technology Advancement (IITA).

2. Description of the Related Art

Conventional firewalls and conventional intrusion detection systems obtain the source and target addresses of a network packet by analyzing the header of the network packet, and determine the access path of a user. Therefore, illegitimate users may attempt to access a web server or other network equipment through an anonymous server in order to hide their network information (e.g., internet protocol (IP) addresses). Anonymous server may cache web pages desired by users and may provide the cached web pages to users on behalf of web servers. Anonymous servers are supposed to distribute network traffic, but nowadays are being misused to intrude web servers.

Hypertext transfer protocol (HTTP) packets include a source internet protocol (IP) address and a target IP address. If a user attempts to access a web server through an anonymous server, the anonymous server may become the source IP address of an HTTP packet sent by the user. Therefore, it is difficult for conventional firewall and intrusion detection systems to locate illegitimate users who attempt to access a web server through an anonymous server.

Intrusion detection systems may acquire information regarding illegitimate users from an anonymous server used by the illegitimate users in order to track down the illegitimate users. However, it generally takes a considerable amount of time and effort to search through anonymous servers. In addition, it is very difficult to track down illegitimate users especially when the illegitimate users attempt to access a web server through more than one anonymous server.

In order to address these problems, Java applet- or ActiveX-based backtrack techniques have been suggested. However, such Java applet- or ActiveX-based backtrack techniques may not be able to properly track down illegitimate users who block popup windows with the use of their web browsers or use security programs.

In the meantime, Korean Patent Registration No. 10-0577829 discloses a traceback system, which can be executed in a web browser of a user and can thus locate the user, and an operating method of the traceback system. The patented system and method, however, require the modification of hypertext markup language (HTML) source code to be provided to a client and require communication involving the use of a moving image media protocol.

SUMMARY OF THE INVENTION

The present invention provides a web-based traceback system and method using reverse caching proxy, in which network information and location information of a user can be effectively tracked down by inserting a tracking code into a response page for a hypertext transfer protocol (HTTP) packet transmitted by the user for the purpose of accessing a web server.

The present invention also provides a web-based traceback system and method using reverse caching proxy, which can minimize damage to a web server caused by a web attack launched by a malicious user and can help the web server resume its operation quickly.

The present invention also provides a web-based traceback system and method using reverse caching proxy, which can easily acquire position information and network information of an illegitimate user who accesses a web server via an anonymous server without installing an agent program in a client.

According to an aspect of the present invention, there is provided a web-based traceback system using reverse caching proxy, the web-based traceback system including a reverse caching proxy server receiving a hypertext transfer protocol (HTTP) packet transmitted to a web server by a client, analyzing the header of the HTTP packet and determining whether the client has attempted to access the web server through an anonymous server based on the results of the analysis; and a web tracking server generating a response page for the HTTP packet upon receiving the results of the determination performed by the reverse caching proxy server, inserting a tracking code in the response page, and providing the response page to the client through the reverse caching proxy server, wherein the tracking code is automatically executed in a web browser of the client and thus provides network information of the client to the web tracking server.

According to another aspect of the present invention, there is provided a web-based traceback method using reverse caching proxy, which is performed by a reverse caching proxy server provided between a client and a web server, the web-based traceback method including receiving an HTTP packet transmitted to the web server by the client, analyzing the header of the HTTP packet transmitted by a client and determining whether the client has attempted to access the web server through an anonymous server based on the results of the analysis; and if the client is determined to have attempted to access the web server through the anonymous server, transmitting a response page for the HTTP packet to the client, the response page having a tracking code inserted therein, wherein the tracking code transmits network information of the client.

Therefore, according to the present invention, it is possible to easily acquire network information and location information of an illegitimate user who attempts to access a web server through an anonymous proxy server, without a requirement of installing any agent program in a client.

In addition, it is possible to avoid suspicion by inserting a tracking code into a response page for an HTTP packet transmitted by a user who attempts to access a web server through an anonymous proxy server and transmitting the response page to the user.

Moreover, it is possible to effectively protect web servers by enabling a reverse caching proxy server to provide previously-cached web pages or content to users on behalf of web servers and thus to become the target of various attacks launched by illegitimate users.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Figure 1:
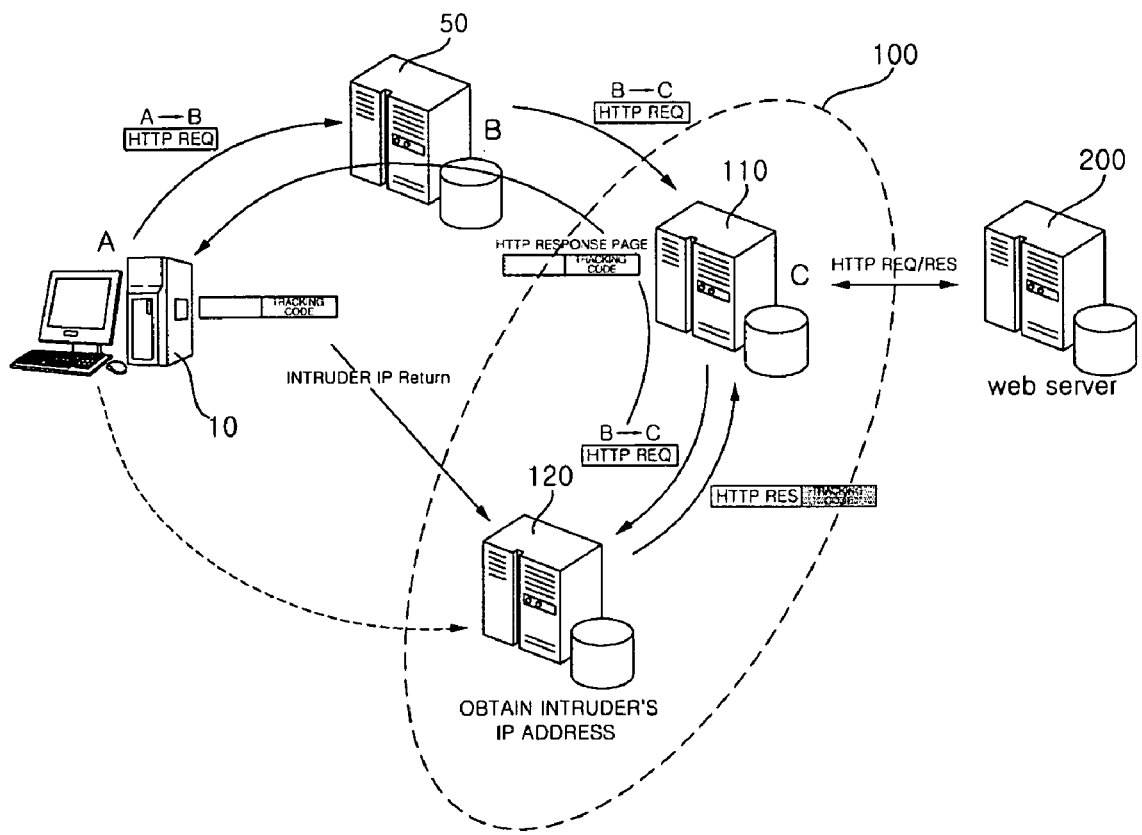
FIG. 1 illustrates a schematic diagram of a web-based traceback system using reverse caching proxy, according to an exemplary embodiment of the present invention.

FIG. 1 illustrates a schematic diagram of a web-based traceback system 100 using reverse caching proxy according to an exemplary embodiment of the present invention. Referring to FIG. 1, the web-based traceback system 100 may include a reverse caching proxy server 10 and a web tracking server 120, which are both provided between a web server 200 and a client 10.

The client 10 may access the reverse caching proxy server 10 through the anonymous server 50 along a path from A to B and from B to C. However, a conventional firewall or intrusion detection system may identify a path from B to C as the access path of the client 10.

The reverse caching proxy server 10 may store information regarding the anonymous server 50 and internet protocol (IP) information of the web server 200. The reverse caching proxy server 110 may determine whether the client 10 has attempted to access the web server 200 through the anonymous server 50 based on the information regarding the anonymous server 50 and the IP information of the web server 200.

If the client 10 attempts to illegitimately access the web server 20 through, for example, a proxy server, the reverse caching proxy server 10 may transmit a response page for a hypertext transfer protocol (HTTP) packet transmitted by the client 10 to the client 10 on behalf of the web server 200. The response page may include a tracking code for feeding back network information of the client 10 to the web tracking server 120.

The tracking code may be written in Javascript, and may be automatically executed in a web browser of the client 10. The tracking code may acquire network information of the client 10 such as an IP address, a media access control (MAC) address or host information of the client 10 when executed in the web browser of the client 10. The tracking code may transmit the acquired network information to the web tracking server 120 through extended markup language (XML) socket communication. The tracking code may terminate the XML socket communication when the transmission of the acquired network information to the web tracking server 120 is complete. Therefore, it is possible to acquire the network information of the client 10 without being noticed by the client 10. A tracking code may be allocated only to users who use the anonymous server 50. That is, no tracking code may be allocated to users with good intent.

The reverse caching proxy server 110 may cache web pages or content provided by the web server 200, and may feed back the cached web pages or content to the client 10. More specifically, the reverse caching proxy server 110 may provide web pages or content to the client 10 on behalf of the web server 200. If a web page or content requested by the client 10 is yet to be cached by the reverse caching proxy server 110, the reverse caching proxy server 110 may issue a request for the requested web page or content to the web server 200, may receive the requested web page or content from the web server 200, and may provide the received web page or content to the client 10.

In this manner, the reverse caching proxy server 110 may respond to attacks launched against the web server 200 by malicious users on behalf of the web server 200.

Therefore, the reverse caching proxy server 110 may be able to protect the web server 200 from external attacks.

Figure 2:
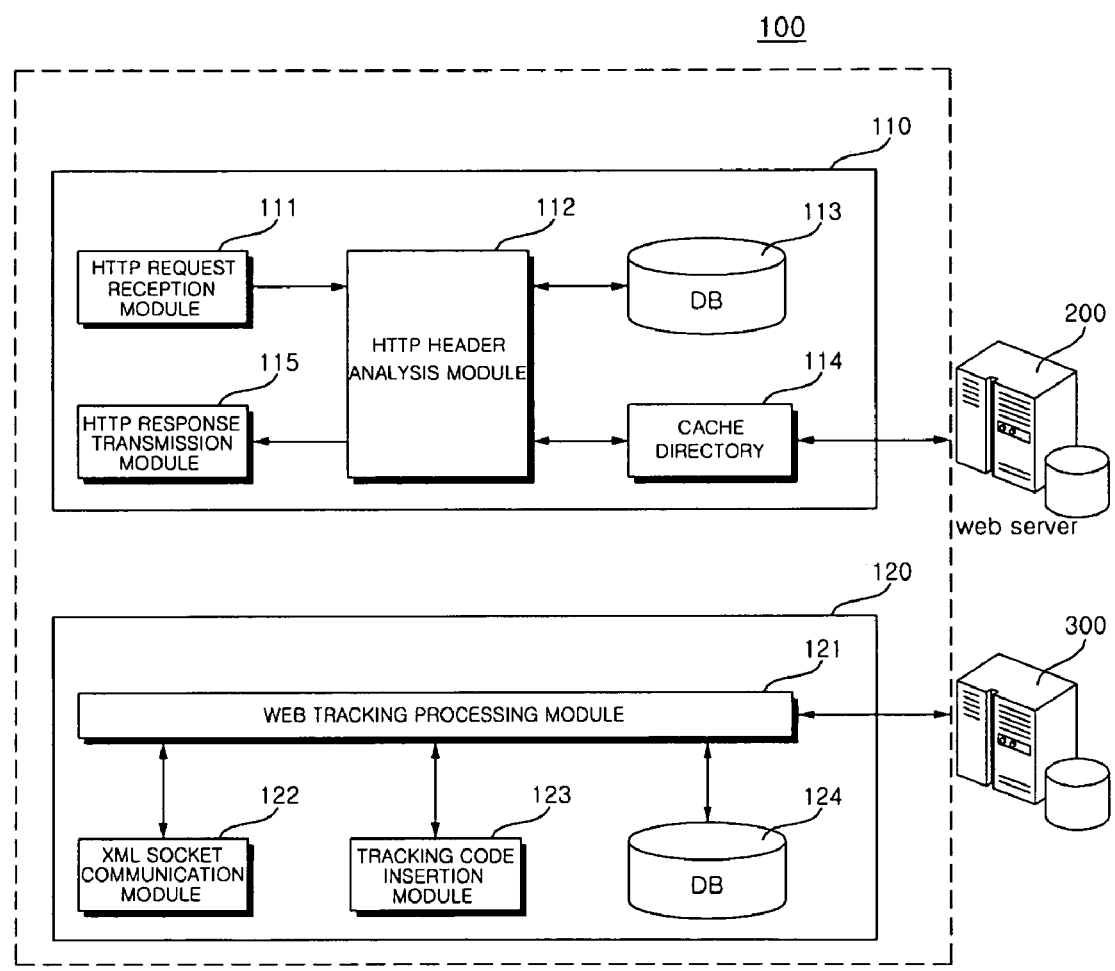
FIG. 2 illustrates a block diagram of the web-based traceback system shown in FIG. 1.

FIG. 2 illustrates a block diagram of the web-based traceback system 100 shown in FIG. 1. Referring to FIG. 2, the reverse caching proxy server 110 may include an HTTP request reception module 111, an HTTP header analysis module 112, a database 113, a cache directory 114, and an HTTP response transmission module 115.

The HTTP request reception module 111 may receive an HTTP packet transmitted to the web server 200 through a network by the client 10, and may transmit the received HTTP packet to the HTTP header analysis module 112.

The database 113 may store a blacklist of illegitimate servers or the hosts of the anonymous servers and IP information. The IP information may be an IP address allocated to a region or a country in which the web server 200 or the reveres caching proxy server 110 is located.

The HTTP header analysis module 112 may determine whether the client 10 has attempted to access the web server 200 through a proxy server or the anonymous server 50 by referencing the blacklist or the IP information present in the database 113. In addition, the HTTP header analysis module 112 may issue a request for a web page requested by the client 10 to the cache directory 114.

The HTTP header analysis module 112 may notify the web tracking server 120 of information regarding the client 10 if the client 10 is suspected to have attempted to access the web server 200 through, for example, a proxy server. Thereafter, the HTTP header analysis module 112 may receive a response page for an HTTP packet transmitted by the client 10 from the web tracking server 120, and may provide the response page to the client 10 through the HTTP response transmission module 115.

The response page may include a tracking code. The tracking code may be automatically executed in the web browser of the client 10 and may thus transmit the network information of the client 10 to the web tracking server 120, as described above with reference to FIG. 1. The cache directory 114 may acquire web pages or content provided by the web server 200 and may store the acquired web pages or content in advance. Then, the cache directory 114 may return a web page or content requested by the HTTP header analysis module 112 to the HTTP header analysis module 112. In short, if the client 10 is suspected to have attempted to access the web server 200 through the anonymous server 50, the HTTP header analysis module 112 may acquire a response page for an HTTP packet transmitted by the client 10 from the web tracking server 120, and may return the response page to the client 10. Then, a tracking code included in the response page may be automatically executed in the web browser of the client 10, and may thus transmit the network information of the client 10 to the web tracking server 120.

The web tracking server 120 may include a web tracking processing module 121, an XML socket communication module 122, a tracking code insertion module 123 and a database 124.

The web tracking processing module 121 may maintain a connection to the HTTP header analysis module 112, and may acquire the network information of the client 10 from the HTTP header analysis module 112. The web tracking processing module 121 may notify the tracking code insertion module 123 of the network information of the client 10, which is suspected to have used the anonymous server 50. The tracking code insertion module 123 may insert a tracking code in a response page for an HTTP packet transmitted to the reverse caching proxy server 110 by the client 10, and may return the response page to the web tracking processing module 121. The web tracking processing module 121 may provide the response page to the HTTP header analysis module 112. Then, the HTTP header analysis module 112 may transmit the response page to the client 10.

When executed in the web browser of the client 10, the tracking code included in the response page acquires the network information of the client 10 (such as one of the IP address, the MAC address and host information of the client 10), and transmits the network information of the client 10 to the XML socket communication module 122 through XML socket communication.

The XML socket communication module 122 may provide the network information of the client 10 to the web tracking processing module 121. The web tracking processing module 121 may store the network information of the client 10 in the database 124.

If a request for the network information of the client 10 is received by a network administrator, the web tracking processing module 121 may transmit the network information of the client 10 to the network information search server 300 through the XML socket communication module 122, and may obtain location information of the client 10 from the network information search server 300. The network information search server 300 may be a server for providing a 'WHOIS' service.

Figure 3:
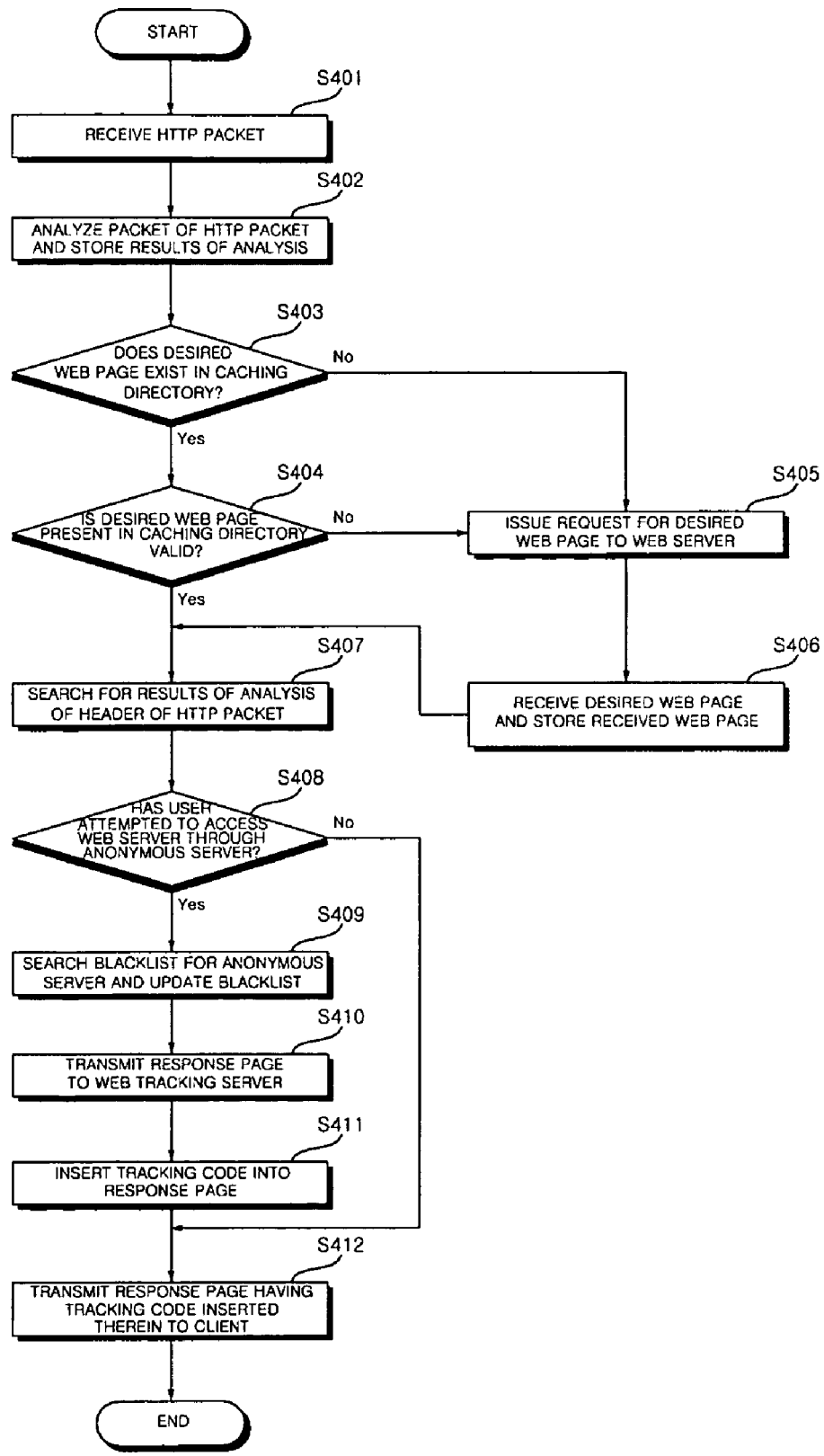
FIG. 3 illustrates a flowchart of a web-based traceback method using reverse caching proxy, according to an exemplary embodiment of the present invention.

FIG. 3 illustrates a web-based traceback method using reverse caching proxy, according to an exemplary embodiment of the present invention. The web-based traceback method shown in FIG. 3 may be performed by the reverse caching proxy server 110.

Referring to FIGS. 1 through 3, the client 10 may transmit an HTTP packet to the web server 200 in order to access the web server 200. The reverse caching proxy server 110 may receive the HTTP packet (S401), and may transmit the HTTP packet to the HTTP header analysis module 112.

The HTTP header analysis module 112 may analyze the header of the HTTP packet, and may thus identify the IP address and the host name of the client 10. Thereafter, the HTTP header analysis module 112 may store the results of the analysis (S402).

Thereafter, the HTTP header analysis module 112 may determine whether the cache directory 114 holds a web page (or content) requested by the client 10 (S403). If the cache directory 114 holds the web page requested by the client 10, it may be determined whether the web page requested by the client 10 is valid (S404). If the web page requested by the client 10 is valid, the cache directory 114 may transmit the web page requested by the client 10 to the HTTP header analysis module 112.

On the other hand, if the web page requested by the client 10 does not exist in the cache directory 114 or if the web page requested by the client 10 is not valid, a issue for the web page requested by the client 10 may be issued to the web server 200 (S405). Thereafter, the cache directory 114 may receive the web page requested by the client 10 from the web server 200 as an HTTP response page, and may store the HTTP response page (S406). Thereafter, the cache directory 200 may transmit the HTTP response page to the HTTP header analysis module 112.

The HTTP header analysis module 112 may determine whether the client 10 has attempted to access the web server 200 through the anonymous server 50 (S408) by referencing the results of the analysis performed in operation S402 and IP information present in the database 113.

If the client 10 has attempted to access the web server 200 without using the anonymous server 50, the HTTP header analysis module 112 may transmit the HTTP response page to the client 10 through the HTTP response transmission module 115.

On the other hand, if the client 10 has attempted to access the web server 200 through the anonymous server 50, the HTTP header analysis module 112 may determine whether the anonymous server 50 is registered in the blacklist present in the database 113. If the anonymous server 50 is yet to be registered in the blacklist present in the database 113, the blacklist present in the database 113 may be updated by registering the anonymous server 50 (S409). Thereafter, the HTTP response page may be transmitted to the web tracking server 120 (S410).

The HTTP response page may be transmitted to the tracking code insertion module 103 of the web tracking server 120. The tracking code insertion module 103 may insert a tracking code 120 written in Javascript into the HTTP response page (S411). The tracking code 120 may be automatically executed in the web browser of the client 10. Thereafter, the HTTP response page having the tracking code 120 may be transmitted to the client 10 through the reverse caching proxy 110 (S412).

Figure 4:
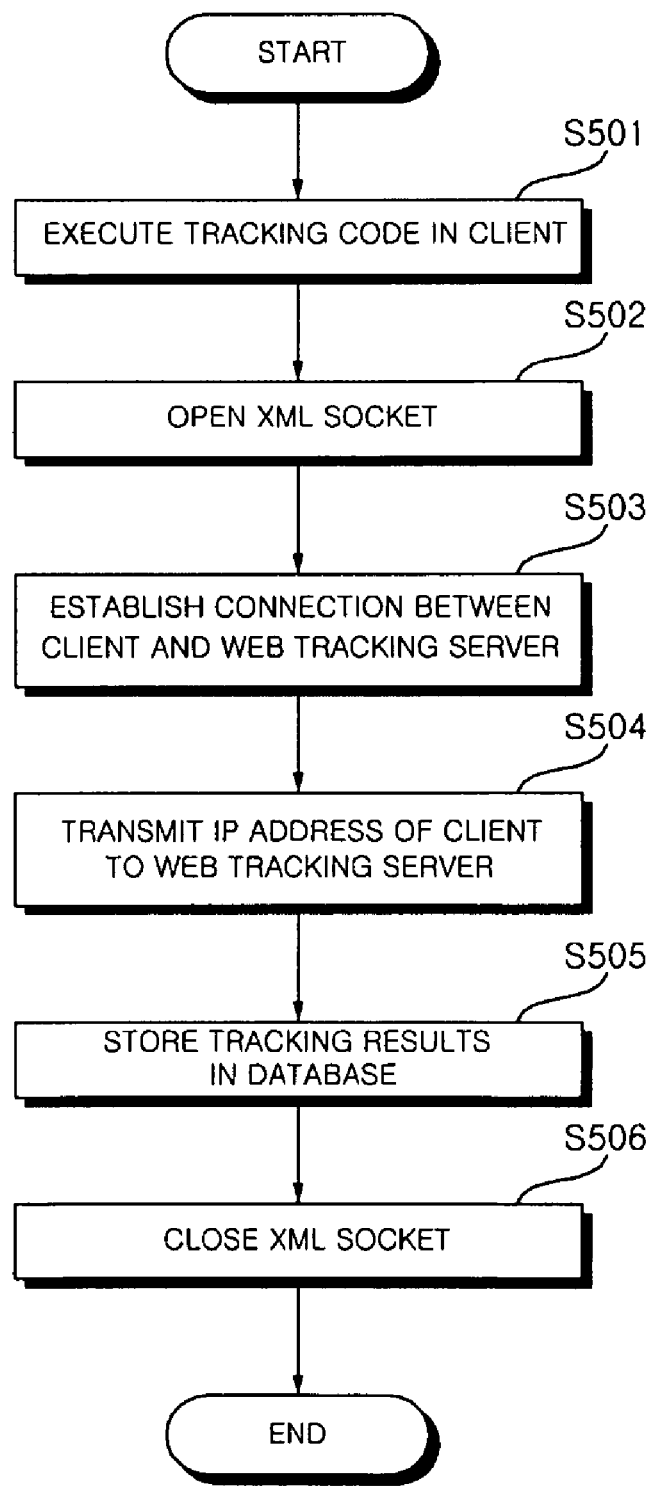
FIG. 4 illustrates a flowchart of the execution of a tracking code in a client according to an exemplary embodiment of the present invention.

FIG. 4 illustrates a flowchart of the execution of a tracking code in a client according to an exemplary embodiment of the present invention. Referring to FIG. 4, if the client 10 attempts to access the web server 200 through the internet, the web server 200 may transmit an HTTP response page having a tracking code hidden therein to the client 10. The tracking code in the HTTP response page may be automatically executed in the web browser of the client 10 (S501).

More specifically, the tracking code in the HTTP response page may be written in Javascript, and may be automatically executed without being noticed by the client 10. Thereafter, the tracking code in the HTTP response page may open an XML socket in order to communicate with the XML socket communication module 122 (S502).

Thereafter, the tracking code in the HTTP response page may attempt to connect the client 10 to the web tracking server 120 by performing TCP/IP communication using the XML socket (S503). Thereafter, the tracking code in the HTTP response page may transmit the IP address and the host name of the client 10 to the web tracking server 120 (S504).

The web tracking server 120 may store the IP address and the host name of the client 10 in the database 124 (S505). Thereafter, the web tracking server 120 may obtain location information of the client 10 from the network information search server 300 for providing, for example, a 'WHOIS' service. Thereafter, the web tracking server 120 may store the location information of the client 10 in the database 124.

Thereafter, the tracking code in the HTTP response page may close the XML socket (S506).

The present invention can be applied to the establishment and maintenance of network security and the detection of network viruses.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A web-based traceback system using reverse caching proxy, the web-based traceback system comprising:
a reverse caching proxy server device receiving a hypertext transfer protocol (HTTP) packet transmitted to a web server device by a client device, analyzing header of the HTTP packet and determining whether the client device has attempted to access the web server device through an anonymous server device based on results of the analysis; and
a web tracking server device generating a response page for the HTTP packet upon receiving results of the determination performed by the reverse caching proxy server device, inserting a tracking code in the response page, and providing the response page to the client device through the reverse caching proxy server device,
wherein the tracking code is allocated only to the client device which accesses the web server device through the anonymous server device, and is automatically executed in a web browser of the client device and thus provides network information of the client device to the web tracking server device,
wherein the reverse caching proxy server device comprises a database storing a blacklist of illegitimate servers and an HTTP header analysis module determining whether the client has attempted to access the web server device through the anonymous server device,
wherein the HTTP header analysis module determines whether the client device has attempted to access the web server device through the anonymous server device by referencing the results of the analysis performed in analyzing the header of the HTTP packet and identifying IP address and host name of the client device, and IP information present in the database storing the blacklist of illegitimate servers.

2. The web-based traceback system of claim 1, wherein, if it is determined that the client device has attempted to access the web server device through the anonymous server device, the HTTP header analysis module determines whether the anonymous server device is included in the blacklist, and adds the anonymous server device to the blacklist if the anonymous server device is not included in the blacklist.

3. The web-based traceback system of claim 1, wherein the reverse caching proxy server device further comprises a cache directory caching a web page of the web server device, and, if it is determined that the client device has not used the anonymous server device to transmit the HTTP packet, the reverse caching proxy server device issues a request for a web page requested by the client device to the cache directory, rather than to the web server device.

4. The web-based traceback system of claim 3, wherein, if the web page requested by the client device does not exist in the cache directory, the reverse caching proxy server device issues a request for the web page requested by the client device to the web server device.

5. The web-based traceback system of claim 1, wherein the web tracking server device comprises a web tracking processing module maintaining a connection to the reverse caching proxy server device and receiving information indicating whether the client device has attempted to access the web server device through the anonymous server device from the reverse caching proxy server device, a track code insertion module receiving the information indicating whether the client device has attempted to access the web server device through the anonymous server device from the web tracking processing module and inserting the tracking code into the response page to be transmitted to the client device by the web server device, an extended markup language (XML) socket communication module performing XML socket communication with the tracking code when the tracking code is automatically executed in the web browser of the client device, and a database receiving network information of the client device from the XML socket communication module and storing the received network information.

6. The web-based traceback system of claim 5, wherein the tracking code is written in Javascript, transmits one of an internet protocol (IP) address, a media access control (MAC) address and host information of the client device to the web tracking server device through the XML socket communication when automatically executed in the web browser of the client device, and is closed when the transmission of the network information of the client device is complete.

7. The web-based traceback system of claim 6, wherein the web tracking processing module transmits the network information of the client device to a network information search server device during the transmission of the network information of the client device by the tracking code, receives location information corresponding to the network information of the client device from the network information search server device, and stores the received location information in the database.

8. A web-based traceback method using reverse caching proxy, which is performed by a reverse caching proxy server device provided between a client device and a web server device, the web-based traceback method comprising:
receiving an HTTP packet transmitted to the web server device by the client device, analyzing header of the HTTP packet transmitted by the client device and determining whether the client device has attempted to access the web server device through an anonymous server device based on results of the analysis; and
when the client device is determined to have attempted to access the web server device through the anonymous server device, transmitting a response page for the HTTP packet to the client device, the response page having a tracking code inserted therein,
wherein the tracking code is allocated only to the client device which accesses the web server device through the anonymous server device,
wherein the tracking code transmits network information of the client device,
wherein the determining comprises referencing the results of the analysis performed in analyzing the header of the HTTP packet and identifying IP address and host name of the client device, and IP information present in a database storing a blacklist of illegitimate servers.

9. The web-based traceback method of claim 8, wherein the tracking code is written in Javascript and is automatically executed in a web browser of the client device.

10. The web-based traceback method of claim 8, wherein the network information of the client device comprises one of an IP address, a MAC address and host information of the client device.

11. The web-based traceback method of claim 8, wherein the reverse caching proxy server device caches a web page of the web server device, and may transmit the cached web page, instead of a web page requested by the client device, to the client device if the client device attempts to legitimately access the web server device.

12. The web-based traceback method of claim 8, wherein the tracking code transmits the network information of the client device to the web tracking server device through XML socket communication when automatically executed in a web browser of the client device.

* * * * *